United States Patent [19]

Skene et al.

[11] Patent Number: 4,961,785

[45] Date of Patent: Oct. 9, 1990

[54] SMEAR RESISTANT INKS FOR THERMAL INK-JET PRINTERS

[75] Inventors: John M. Skene, Lake Oswego; Charles L. Thierheimer, Jr.; Suraj L. Hindagolla, both of Corvallis, all of Oreg.

[73] Assignee: Hewlett-Packard Company, Palo Alto, Calif.

[21] Appl. No.: 309,516

[22] Filed: Feb. 9, 1989

[51] Int. Cl.⁵ ............................................. C09D 11/02
[52] U.S. Cl. ......................................... 106/22; 106/20
[58] Field of Search ................................... 106/20, 22

[56] References Cited

U.S. PATENT DOCUMENTS

| | | | |
|---|---|---|---|
| 3,889,269 | 6/1975 | Meyer et al. | 106/22 |
| 4,153,467 | 5/1979 | Yano et al. | 106/22 |
| 4,159,203 | 6/1979 | Loock | 106/22 |
| 4,290,812 | 9/1981 | Loock | 106/22 |
| 4,365,998 | 12/1982 | Sugiyama et al. | 106/22 |
| 4,395,288 | 7/1983 | Elda et al. | 106/22 |
| 4,409,040 | 10/1983 | Tobayashi et al. | 106/22 |
| 4,505,749 | 3/1985 | Kanekiyo et al. | 106/20 |
| 4,661,158 | 4/1987 | Kobayashi et al. | 106/22 |
| 4,677,445 | 6/1987 | Haruta | 106/22 |
| 4,683,002 | 7/1987 | Mirua et al. | 106/22 |

*Primary Examiner*—Paul Lieberman
*Assistant Examiner*—Helene Klemanski

[57] ABSTRACT

Inks for ink-jet printing have improved smear resistance when they contain from about 15 to 50%, preferably from about 20% to about 30%, formamide.

10 Claims, No Drawings

SMEAR RESISTANT INKS FOR THERMAL INK-JET PRINTERS

TECHNICAL FIELD

This invention relates to ink formulations for thermal ink-jet printers.

BACKGROUND ART

Thermal ink-jet printers operate by employing a plurality of resistor elements to expel droplets of ink through an associated plurality of nozzles. In particular, each resistor element, which is typically a pad of resistive material measuring about 50 $\mu m \times 50$ $\mu m$, is located in a chamber filled with ink supplied from an ink reservoir. A nozzle plate, comprising a plurality of nozzles, or openings, with each nozzle associated with a resistor element, defines part of the chamber. Upon energizing of a particular resistor element, a droplet of ink is expelled through the nozzle toward the print medium, whether paper, fabric, or the like. The firing of ink droplets is typically under the control of a microprocessor, the signals of which are conveyed by electrical traces to the resistor elements. By proper selection of the signals alphanumeric and other characters are formed on the print medium.

The tight tolerances of the nozzles (typically 50 $\mu m$ diameter) require that the ink not clog the nozzles. Further, repeated firings of the resistor elements, which must withstand about 10 million firings over the life of the ink cartridge, can result in fouling of the resistor element. Finally, the ink composition must be capable of interacting with the print medium, especially paper, to penetrate the paper without undue spreading, and they should be smear resistance and waterfast.

Inks are known which possess one or more of the foregoing properties. However, few ink compositions are known that possess all the foregoing properties, since an improvement in one property often results in the degradation of another property. Thus, many inks used commercially represent a compromise in an attempt to achieve an ink evidencing at least an adequate response in each of the foregoing considerations.

Accordingly, investigations continue into developing ink formulations which have improved properties and which do not elevate one property at the expense of the others.

DISCLOSURE OF THE INVENTION

In accordance with the invention, the smear resistance of water soluble inks in formulations used in thermal ink-jet printers is significantly improved by the addition thereto of about 15 to 50 weight % of formamide.

BEST MODES FOR CARRYING OUT THE INVENTION

The ink formulations of the present invention comprise, by weight, from about 15% to about 50% formamide, from about 1% to about 10% dye, and the balance water. Preferred formulations comprise, by weight, from about 20% to about 30% formamide, from about 1% to about 4% dye, and the balance water.

A drying time improver can be incorporated to shorten the period that the ink is moist after it is ejected on to the print medium. The improver will be volatile liquid, such as a lower alcohol, i.e., one containing from 1 to 4 carbon atoms. Particularly useful is 1-propanol.

The ink formulation can include up to about 10% by weight of a drying time improver, preferably from about 2% to about 3%. Excessive amounts of improver can adversely affect the quality of the print by causing the ink to spray as it is ejected from the printer.

The present invention can use anionic or cationic dyes of any color. Typical anionic dyes contain sulfonate or carboxylate groups. Typical cationic dyes have polymethine or arylcarbonium groups. Formamide provides these dyes enhanced water and smear resistance with respect to a water or water and glycol vehicle, such as those frequently used in high lighting markers. Additionally, the resistance to handling is improved.

Since formamide decomposes on either side of pH 6.5, a buffer may be used to keep inks that contain formamide at a pH from about 4 to about 7.5, preferably from about 6 to about 7. Buffers such as ammonium acetate, ammonium formate, 2-[N-morpholino] ethanesulfonic acid, or 3-[N-morpholino-]-2-hydroxypropane sulfonic acid may be used for this purpose.

The biocides useful in this invention may be any one or more of the biocides that are commonly used with inks for thermal jet printers.

The inks of this invention have enhanced water-fastness, particularly inks that have marginal water-fastness without formamide. For example, a water-glycol ink containing DB168 has a DL of approximately 20, while the same ink with formamide has a DL of 4-5. The water-fastness of a print sample is determined by measuring its initial L* coordinate. It is then placed in a beaker of water and washed for five minutes. After that time, it is dried and the L* coordinate is remeasured. The difference between the initial and the final L* is the DL.

With suitable conductive additives, the formulations of this invention can be used for continuous ink-jet printers. Any non-corrosive, low toxicity, water-soluble salt may be used at a concentration from about 0.01 wt% to about 0.1%. Lower alkyl ammonium chlorides are typical examples.

INDUSTRIAL APPLICABILITY

The ink formulations of the present invention can be used wherever aqueous inks are employed and there is need for a water resistant print. They are, however, specifically designed to operate in a thermal ink-jet device, such as the DeskJet ™ printer. DeskJet is a trademark of Hewlett-Packard Company.

EXAMPLE 1

An ink was formulated consisting, by weight, of
2.5% Food Black
25% formamide
3% 1-propanol,
0.05% ammonium acetate, and
balance water.

This ink had a pH of 7. It also had excellent print quality, smear resistance, crusting, and kogation.

EXAMPLE 2

The following inks were made in 25 ml samples, using 2% dye loading and the balance water. The inks were printed in a DeskJet printer. High-lighting of the test was done by hand, using a commercially available felt tip pen, and the optical density of the resulting smear was measured with a MacBeth optical densitometer. A low optical density measurement indicates an increase of smear resistance.

| Ink | Dye | Formamide, wt % | Smear Resistance (OD) |
|-----|-------|------|------|
| A | DB168 | 7.0 | 0.18 |
| B | DB168 | 15.0 | 0.14 |
| C | DB168 | 30.0 | 0.05 |
| D | FB2 | 7.0 | 0.15 |
| E | FB2 | 15.0 | 0.09 |
| F | FB2 | 30.0 | 0.05 |

The smear resistance of the inks to water based highlighters increases with formamide content. These inks had good darkness and print quality.

EXAMPLE 3

The waterfastness of samples A, B, and C were measured according to the procedure set out above. The changes of L* coordinate (DL) were 11.6, 8.5, and 4.3, respectively.

We claim:

1. An ink suitable for ink-jet printing, consisting of, by weight,
   (a) from about 15% to about 50% formamide,
   (b) from about 1% to about 10% dye,
   (c) a buffer to provide a pH from about 4 to about 10,
   (d) from 0% up to about 10% drying time improver selected from the group consisting of lower alcohols having from 1 to about 4 carbon atoms,
   (e) from 0% up to about 0.1% of a non-corrosive, low toxicity, water-soluble conductive salt,
   (f) a biocide, and
   (g) water.

2. An ink of claim 1 which has been buffered to a pH from about 6 to about 7.

3. An ink of claim 1 which contains, as buffer, ammonium acetate, ammonium formate, 2-[N-morpholino]ethanesulfonic acid, or 3-[N-morpholino]-2-hydroxypropane.

4. An ink of claim 1 wherein the formamide is present in a range from about 20% to about 30%.

5. An ink of claim 1 wherein the dye is present in a range from about 1% to about 4%.

6. An ink of claim 1 which contains from about 2% to about 3% of a drying time improver.

7. An ink of claim 1 which contains from about 2% to about 3% 1-propanol.

8. An ink of claim 1 wherein the salt is a lower alkyl ammonium chloride.

9. An ink suitable for ink-jet printing, consisting of, by weight,
   (a) from about 20% to about 30% formamide,
   (b) from about 1% to about 4% dye,
   (c) sufficient buffer to provide the ink with a pH from about 6 to about 7,
   (d) from about 0% to about 3% drying time improver selected from the group consisting of lower alcohols having from 1 to about 4 carbon atoms,
   (e) from 0% to about 0.1% of a non-corrosive, low toxicity, water-soluble conductive salt,
   (f) a biocide, and
   (g) water.

10. An ink of claim 9 wherein the drying time improver is 1-propanol.

* * * * *